United States Patent
Kamei et al.

(10) Patent No.: US 8,600,258 B2
(45) Date of Patent: Dec. 3, 2013

(54) JOB EXECUTION APPARATUS, BILLING AND REFUNDING METHOD THEREOF AND RECORDING MEDIUM

(75) Inventors: Nobuo Kamei, Osaka (JP); Tomoyuki Okamoto, Suita (JP); Yasuji Takeuchi, Kobe (JP); Tomo Tsuboi, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 294 days.

(21) Appl. No.: 12/433,453

(22) Filed: Apr. 30, 2009

(65) Prior Publication Data

US 2009/0313154 A1 Dec. 17, 2009

(30) Foreign Application Priority Data

Jun. 11, 2008 (JP) ................. 2008-153607

(51) Int. Cl.
*G03G 21/02* (2006.01)
(52) U.S. Cl.
USPC .......................................................... 399/79
(58) Field of Classification Search
USPC .................... 339/79, 34; 399/79, 34
See application file for complete search history.

(56) References Cited

U.S. PATENT DOCUMENTS 6,039,250 A 3/2000 Ito et al.
6,422,464 B1 * 7/2002 Terranova ..................... 235/384

FOREIGN PATENT DOCUMENTS

| EP | 1174271 A1 | * | 1/2002 |
| JP | 2006-40106 | | 2/2006 |
| JP | 2006-318153 | | 11/2006 |
| JP | 2007-48188 | | 2/2007 |
| JP | 2007-109059 | | 4/2007 |
| JP | 2007-140990 | | 6/2007 |
| JP | 2007-299293 | | 11/2007 |
| JP | 2007299293 A | * | 11/2007 |
| WO | WO-97/02539 | | 1/1997 |

OTHER PUBLICATIONS

Japanese Notification of Reasons for Refusal mailed Feb. 2, 2010, directed towards counterpart JP Application No. 2008-153607; 7 pages.
Japanese Notification of Reasons for Refusal mailed May 18, 2010, directed to counterpart Japanese Application No. 2008-153607; 7 pages.

* cited by examiner

*Primary Examiner* — Matthew Gart
*Assistant Examiner* — Michael Maicher
(74) *Attorney, Agent, or Firm* — Morrison & Foerster LLP

(57) ABSTRACT

A job execution apparatus having the function of billing and refunding by electronic money, determines before job execution, an amount of money required for job execution, and bills before job execution, the determined amount of money to a payment medium having the payment function, which is set to a billing apparatus. And the job execution apparatus can transfer a refund to the payment medium set to the billing apparatus if a refund needs to be transferred. The job execution apparatus also can transfer a refund by a method other than the method of refunding to the payment medium by using the billing apparatus.

9 Claims, 14 Drawing Sheets

| Electronic Money ID | Refund Amount | Refund Transferable Days | Refund Method |
|---|---|---|---|
| 0001-1234-5678-0001 | 100 yen | 2 day(s) | Cell-phone |
| 0001-0000-1212-1212 | 200 yen | 5 day(s) | Server |
| 0002-1111-2222-3333 | 500 yen | 1 day(s) | Cell-phone |
| 1000-4567-1413-0241 | 10 yen | 3 day(s) | Server |
| 1111-2345-6789-0001 | 100 yen | 10 day(s) | Server |

| Electronic Money ID | Refund Amount | Refund Transferable Days | Refund Method |
|---|---|---|---|
| 0001-1234-5678-0001 | 100 yen | 2 day(s) | Cell-phone |
| 0001-0000-1212-1212 | 200 yen | 5 day(s) | Server |
| 0002-1111-2222-3333 | 500 yen | 1 day(s) | Cell-phone |
| 1000-4567-1413-0241 | 10 yen | 3 day(s) | Server |
| 1111-2345-6789-0001 | 100 yen | 10 day(s) | Server |

JOB EXECUTION APPARATUS, BILLING AND REFUNDING METHOD THEREOF AND RECORDING MEDIUM

This application claims priority under 35 U.S.C. §119 to Japanese Patent Application No. 2008-153607 filed on Jun. 11, 2008, the entire disclosure of which is incorporated herein by reference in its entirety.

BACKGROUND OF THE INVENTION

1. Field of the Invention

The present invention relates to a job execution apparatus such as an image forming apparatus having the function of billing and refunding by electronic money, a billing and refunding method of the image forming apparatus, and a computer readable recording medium having a billing and refunding program recorded therein to make a computer of the job execution apparatus implement the billing and refunding method.

2. Description of the Related Art

The following description sets forth the inventor's knowledge of related art and problems therein and should not be construed as an admission of knowledge in the prior art.

Conventionally, a job execution apparatus such as an image forming apparatus allowing to use the copy and print functions thereof if coins are fed, is commonly seen in convenience stores and other places. And this job execution apparatus is configured to bill each time one sheet is copied or printed and refund if a change needs to be given after execution of a copy or print job.

Meanwhile, in recent years, we have more occasions to purchase a product by electronic money, by using a cell-phone having the payment function, a credit card or etc. In response to this, there suggested a job execution apparatus allowing to use the copy and print functions thereof, by billing by electronic money to a cell-phone having the payment function or a credit card.

This job execution apparatus is configured to bill to a cell-phone or a credit card by electronic money if it is set to a billing apparatus connected to the body of the job execution apparatus. However, if the method of billing each time one sheet is copied or printed is employed just like in the case of the job execution apparatus with the coin feeding system, it is necessary to keep a cell-phone or a credit card set to the billing apparatus the whole time until completion of job execution. That could increase the risk of thefts.

To resolve this problem, according to Japanese Unexamined Laid-open Patent Publications No. 2007-140990, No. 2007-048188 and No. 2006-318153, there suggested a job execution apparatus that calculates an amount of money required for job execution before job execution and bills the calculated amount to a cell-phone or a credit card collectively before job execution.

With this job execution apparatus, the amount of money required for job execution is collectively billed before job execution. Thus, it is not necessary any more to keep a cell-phone or a credit card set to the billing apparatus the whole time until completion of job execution. That could eliminate the risk of thefts and etc.

However, the job execution apparatus described in those publications above still leaves the following problem.

That is, if a user happens to cancel a job while it is being executed or if an machine trouble or etc. happens to the job execution apparatus, it would sometimes follow that only some operations of the job are executed or no operations of the job are executed. If a user encounters such a situation, it is necessary to set a cell-phone or etc. to the billing apparatus again, in order to receive a refund for unexecuted operations, by using the billing apparatus. Although, since having removed a cell-phone or etc. from the billing apparatus already, the user would frequently forget setting it thereto again. That could cause over-billing troubles.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide a job execution apparatus having the function of billing and refunding by electronic money, which is capable of transferring a refund to a user unfailingly, if the refund needs to be transferred after an amount of money has been billed to a payment medium such as a cell-phone before job execution.

It is another objective of the present invention to provide a billing and refunding method implemented by the job execution apparatus above.

It is yet another objective of the present invention to provide a computer readable recording medium having a billing and refunding program recorded therein to make a computer of the job execution apparatus implement the billing and refunding method above.

According to a first aspect of the present invention, a job execution apparatus comprises:

a determination portion that determines before job execution, an amount of money required for job execution;

a billing apparatus that is capable of being set to a payment medium having the payment function, and billing before job execution the determined amount of money to the payment medium set thereto, and then transferring a refund to the payment medium set thereto if an amount of money practically used for job execution is smaller than the determined amount of money; and a refunding portion that is capable of transferring a refund by a method other than the method of refunding to the payment medium by using the billing apparatus.

According to a second aspect of the present invention, a billing and refunding method of a job execution apparatus having the function of billing and refunding by electronic money, comprises:

determining before job execution, an amount of money required for job execution;

billing before job execution, the determined amount of money to a payment medium having the payment function, which is set to a billing apparatus; and transferring a refund by a method other than the method of refunding to the payment medium set to the billing apparatus, if an amount of money practically used for job execution is smaller than the determined amount of money.

According to a third aspect of the present invention, a computer readable recording medium has a billing and refunding program recorded therein to make a computer of a job execution apparatus having the function of billing and refunding by electronic money, execute:

determining before job execution, an amount of money required for job execution;

billing before job execution, the determined amount of money to a payment medium having the payment function, which is set to a billing apparatus; and transferring a refund by a method other than the method of refunding to the payment medium set to the billing apparatus, if an amount of money practically used for job execution is smaller than the determined amount of money.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
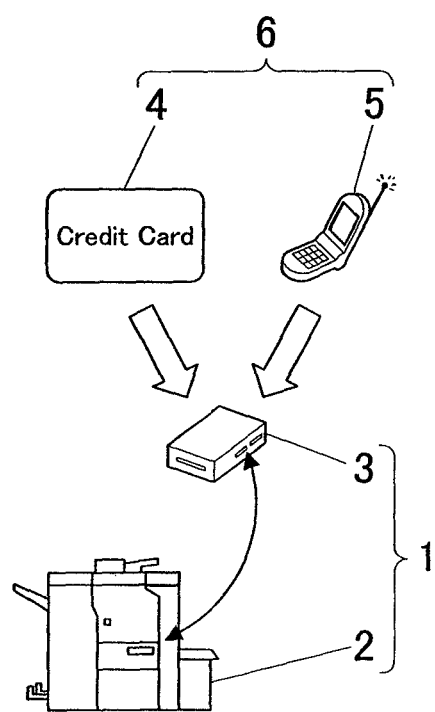
FIG. 1 is a view schematically showing a configuration of an image forming apparatus, as a job execution apparatus according to one embodiment of the present invention.

FIG. 1 is a view schematically showing a configuration of a job execution apparatus according to one embodiment of the present invention.

In this embodiment, an image forming apparatus 1 is employed as the job execution apparatus. And a MFP (Multi Function Peripheral) that is a multifunctional digital machine having the copy function, the print function, the facsimile function and other functions, is employed as the image forming apparatus 1.

The image forming apparatus 1 comprises a main body 2 and a billing apparatus 3 installed on the main body 2. By electronic money, the billing apparatus 3 bills an amount of money required for execution of a print job, a copy job or another job and transfers a refund, to the payment medium 6 such as a credit card 4 or a cell-phone 5 having the function to pay out or receive a settlement amount. Since the billing and refunding method using the billing apparatus 3 is heretofore known, it will not specifically explained in this specification.

Figure 2:
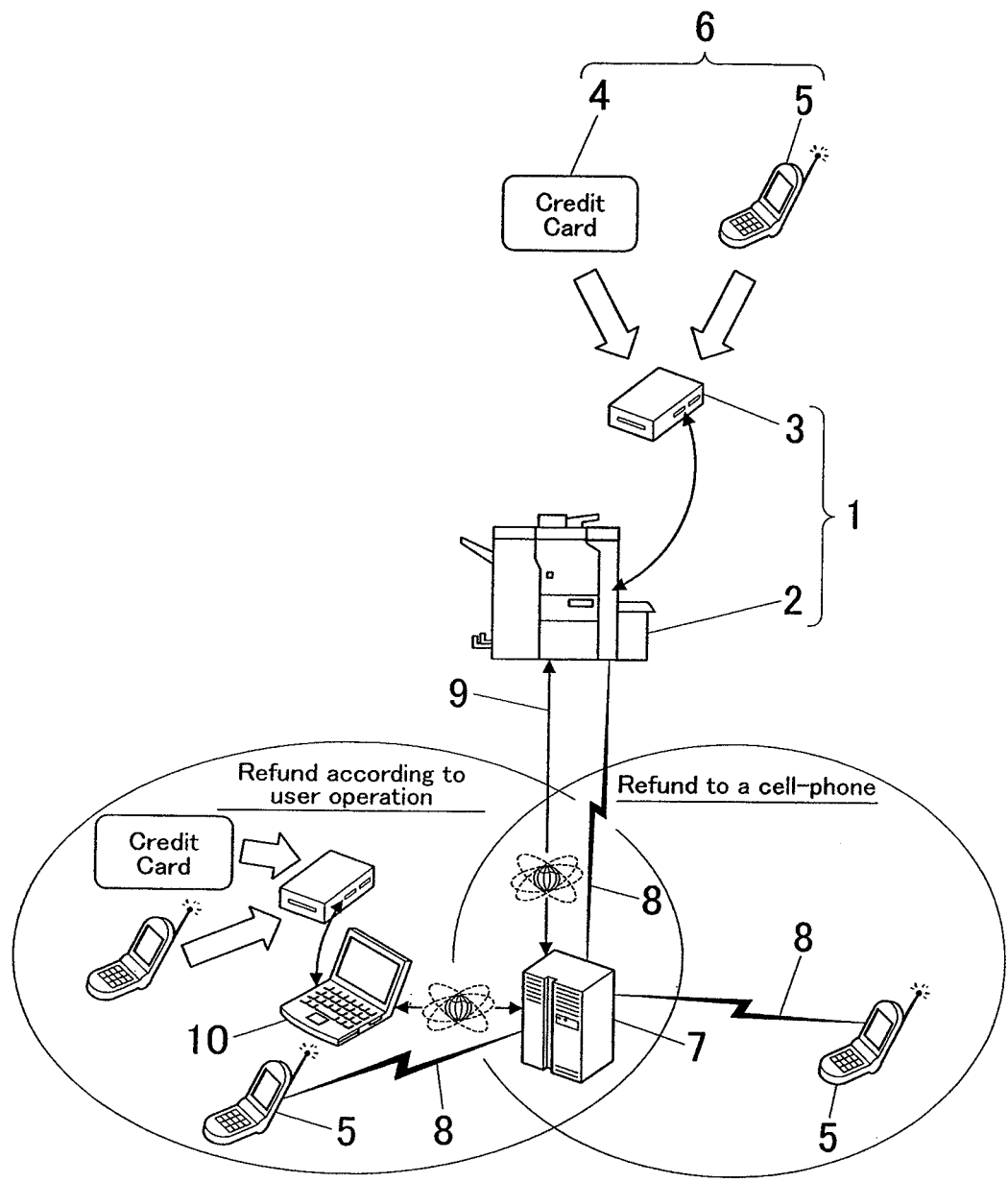
FIG. 2 is a view showing an example of a refunding system to transfer a refund, in which the image forming apparatus is employed.

FIG. 2 is a view showing an example of a refunding system to transfer a refund, in which the image forming apparatus 1 is employed. In this refunding system, the image forming apparatus 1 and an electronic money administration server 7 are interconnected via a telephone circuit 8 or a network 9.

As illustrated in this example, a refund can be transferred by two methods other than the method using the payment medium 6 set to the billing apparatus 3.

As for one of the two methods, a refund is transferred to the cell-phone 5 that is a receiving account to receive electronic money, by way of the electronic money administration server 7 via the telephone circuit 8. As for the other one method, a refund is preliminarily transferred to the electronic money administration apparatus 7 via the network 9, and then, according to an instruction of a user who accesses the electronic money administration server 7 from the terminal apparatus 10, the cell-phone 5 or etc., the refund is further transferred to a receiving account of the user. Users can select a preferable method among those mentioned above, which will be further described later.

Figure 3:
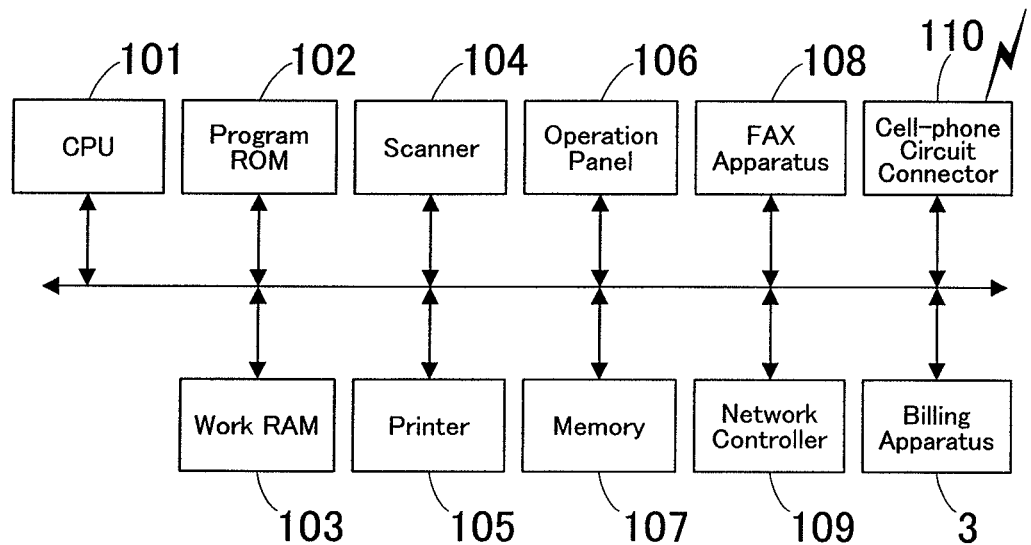
FIG. 3 is a block diagram showing an internal configuration of the image forming apparatus.

FIG. 3 is a block diagram showing an internal configuration of the image forming apparatus 1.

The image forming apparatus 1 comprises a CPU 101, a program ROM 102, a work RAM 103, a scanner 104, a printer 105, an operation panel 106, a memory 107, a facsimile (FAX) apparatus 108, a network controller 109, a cell-phone circuit connector 110, the billing apparatus 3 mentioned above, and others.

The CPU 101 centrally controls the entire image forming apparatus 1. As well as ordinary operations to execute the copy function, the print function and the facsimile function, the CPU 10 controls an operation to determine an amount of money required for job execution before start of job execution, an operation to bill and refund by electronic money, to the payment medium 6 by using the billing apparatus 3, an operation to transfer a refund as electronic money, by a method other than the method of refunding to the payment medium 6 by using the billing apparatus 3, and other operations. These operations will be further described later.

The program ROM 102 is a memory that stores in itself an operation program executed by the CPU 101, and other data. The work RAM 103 is a memory that provides an operation area for the CPU 101 to execute the operation program.

The scanner 104 reads an image of a document placed on a document table (not shown in Figure) and converts it into image data.

The printer 105 prints out image data read out from a document by the scanner 104, print data received from a user terminal, document data stored in the memory 107, and other data, according to specified conditions.

The operation panel 106 is used to perform various entry operations and show screens, messages and etc. It comprises a key entry portion including numeric keys and a start key, and a display such as a liquid crystal display. The operation panel 106 will be further described later.

The memory 107 is a hard disk drive (HDD) for example, and stores in itself image data read out by the scanner 104, image data received from external apparatuses, and various data such as an operation log of the image forming apparatus 1. Furthermore, in this embodiment, the memory 107 stores in itself refund information including a refund amount related to identification information uniquely given to the payment medium 6, and one or more than one Boxes that are memory areas created therein.

The facsimile apparatus 108 transfers and receives facsimile data to and from external facsimile apparatuses via a telephone circuit or etc.

The network controller 109 controls communication with the electronic money administration server 7 and other external apparatuses interconnected thereto via the network 9.

The cell-phone circuit connector 110 serves to connect the image forming apparatus 1 to the electronic money administration server 7 and external cell-phones via the cell-phone circuit 8.

Figure 4:
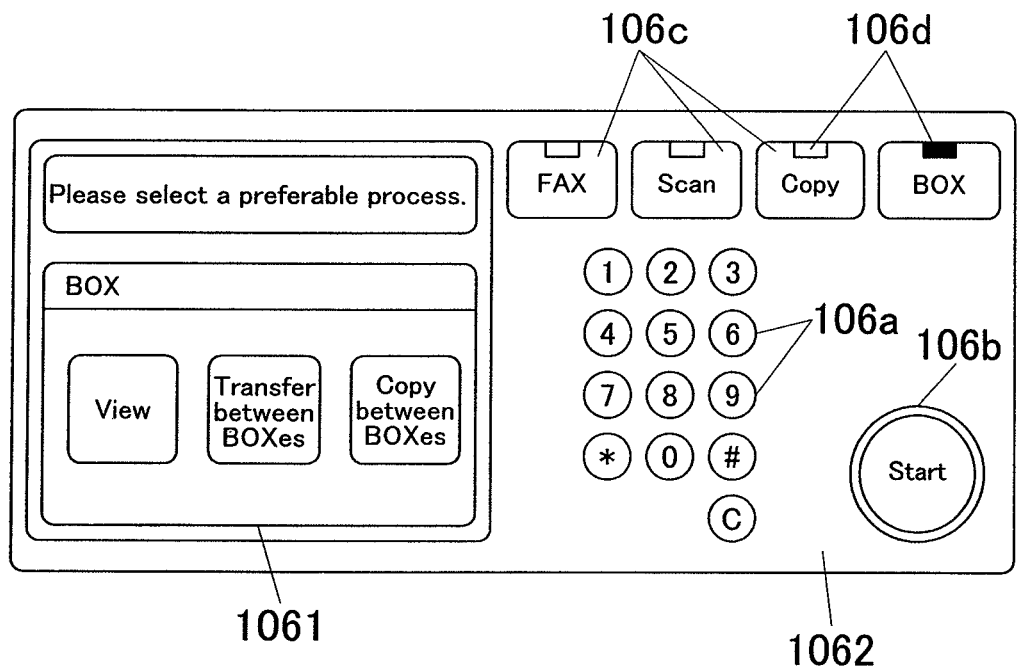
FIG. 4 is a plain view of an operation panel of the image forming apparatus 1 shown in FIG. 1.

FIG. 4 is a plain view of the operation panel 106 of the image forming apparatus 1 shown in FIG. 1.

The operation panel 106 comprises a display 1061 that is a liquid crystal display with touch-panel functionality, to display various information and perform various setting operations, and a key entry portion 1062. The key entry portion 1062 comprises a numeric key pad 106a to enter numeric values, a job start key 106b to start job execution, mode selection keys 106c to select an operation mode of the image forming apparatus 1, and selected mode indicators 106d to indicate which mode selected key 106c is selected. As shown in FIG. 4, the "BOX" mode selection key is already selected.

When user instructs to execute a job by using the display 1061 or the key entry portion 1062, the CPU 101 of the image forming apparatus 1 determines an amount of money required for execution of the job, in other words, an amount of money allowed for use of the image forming apparatus 1. An amount of money allowed for use may be determined according to a calculation result drawn based on the job specified by user, or according to user entry.

For example, when a user specifies a print job to print out image data stored in a Box of the memory 107 or another recording medium by using the operation panel 106, and presses the job start key 108b, the CPU 101 analyzes the job and calculates an amount required for job execution based on the total number of pages, sheet size of respective pages, full-color/monochrome, and the number of sets. Meanwhile, when a user instructs to execute a copy job, he/she is requested to enter an upper limit of an amount of money allowed for use by using the numeric keys of the operation panel 106, and the entered value is determined as an amount of money allowed for use.

Figure 5:
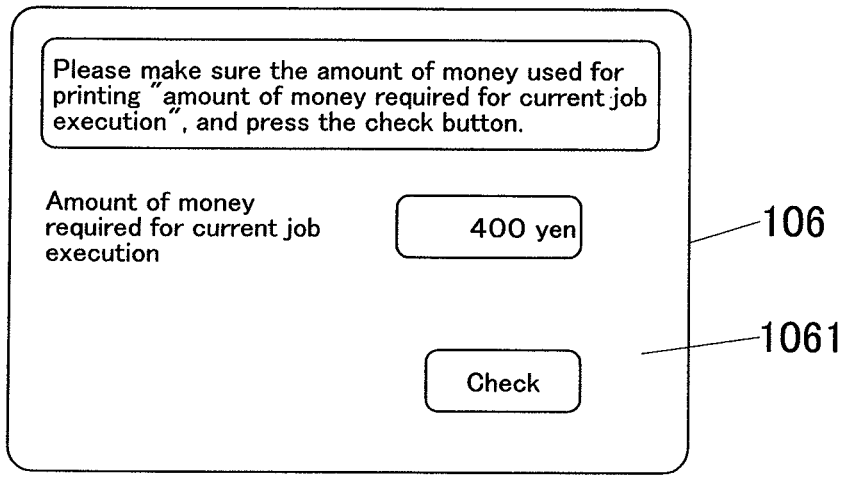
FIG. 5 is a screen to make sure the amount of money used for current job execution, which is displayed when a user instructs to execute a print job.

FIG. 5 shows a screen to make sure an amount of money required for job execution when a user instructs to execute a print job. In this screen, an amount of money required for current job execution and a "check" button are displayed, together with a message requesting to press the "check" button after making sure the amount of money required for job execution.

Figure 6:
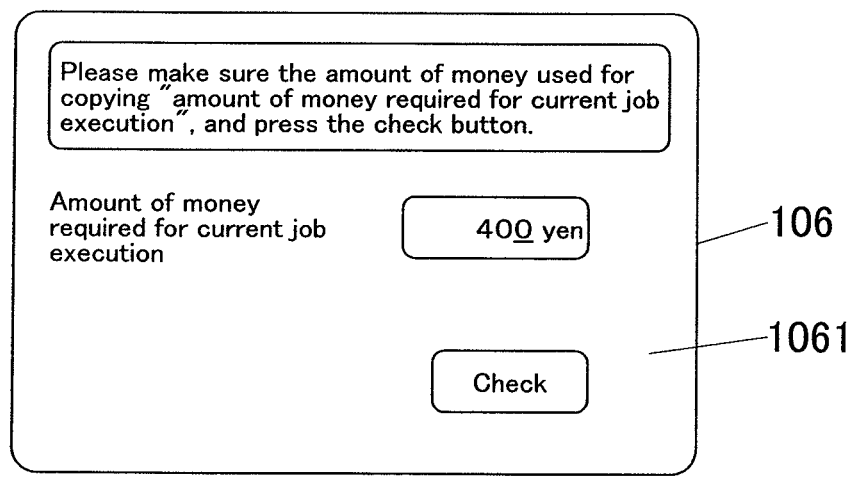
FIG. 6 is a screen to make sure the amount of money used for current job execution, which is displayed when a user instructs to execute a copy job.

FIG. 6 shows a screen to make sure an amount of money allowed for use when a user instructs to execute a copy job. In this screen, an amount of money allowed for current use and a "check" button are displayed, together with a message requesting to press the "check" button after entering the amount of money allowed for use.

Figure 7:
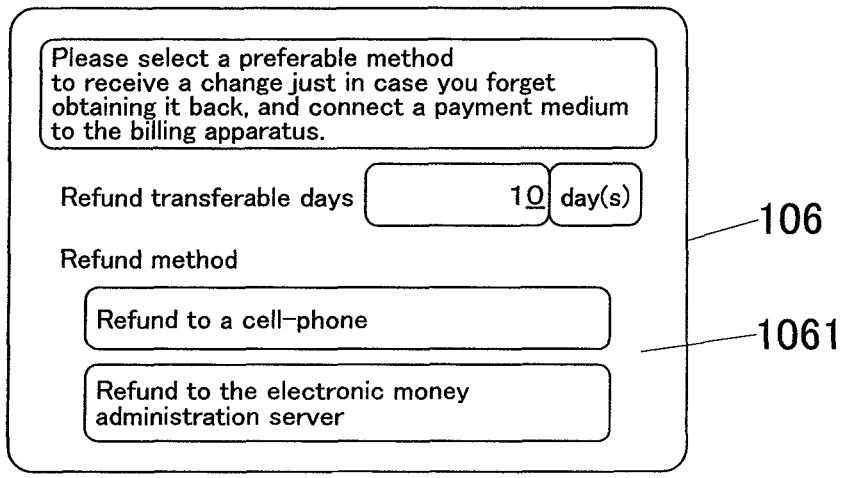
FIG. 7 is a selection screen for users to select a preferable refund method, which is displayed if a refund (a change) needs to be transferred.

In either case, when a user presses the "check" button, the screen is switched to a screen shown in FIG. 7.

FIG. 7 shows a screen for users to select a preferable method to receive a refund (a change) if it needs to be transferred. In this embodiment, if a user having instructed to execute a job sets the payment medium 6 to the billing apparatus 3 within a determined period of time, a refund can be transferred to the payment medium 6 by using the billing apparatus 3. If this user fails to set the payment medium 6 to the billing apparatus 3 within a determined period of time, in other words, he/she forgets obtaining a change (refund) back, a refund can be transferred by a method other than the method using the billing apparatus 3.

Users can select a preferable one among a plurality of methods other than the method using the billing apparatus 3. In this example, users can select among two methods other than the method using the billing apparatus 3, and a refund is transferred to a cell-phone by one of the methods meanwhile a refund is transferred to the electronic money administration server 7 by the other method.

In this screen shown in FIG. 7, as well as the message "please select a preferable method to receive a change just in case you forget obtaining it back, and set a payment medium to the billing apparatus", an entry field to enter a period for accepting a refund by using the billing apparatus 3 (refund transferable days) and buttons to select a refund method are displayed.

As described above, refund transferable days are determined in advance. And then, if a user sets the payment medium 6 to the billing apparatus 3 within the predetermined days, he/she can receive a refund. And even if the user fails to set the payment medium 6 to the billing apparatus 3 within the predetermined days, he/she can receive a refund unfailingly, by his/her selected method.

Other than the method using the billing apparatus 3, a refund may be transferred by one fixed method that is not selected by user. However, user conveniences would be improved if a user can select a preferable one among more than one refund methods.

When a user sets the payment medium 6 to the billing apparatus 3 after entering refund transferable days and selecting a preferable refund method, the screen is switched to a billing completion screen shown in FIG. 8, 9, 10 or 11.

As described above in this embodiment, a refund is kept in the image forming apparatus 1 for the refund acceptable period in case the user forgets obtaining it back, which is determined in the screen shown in FIG. 7. This refund is related to identification information such as an ID number or etc. uniquely given to the credit card 4 or the cell-phone 5 that is the payment medium 6, and recorded in the memory 107 as refund information.

Hereinafter, in advance of explaining the screens shown in FIG. 8 through FIG. 11, refund information will be explained with reference to FIG. 12.

Figures 11, 12:
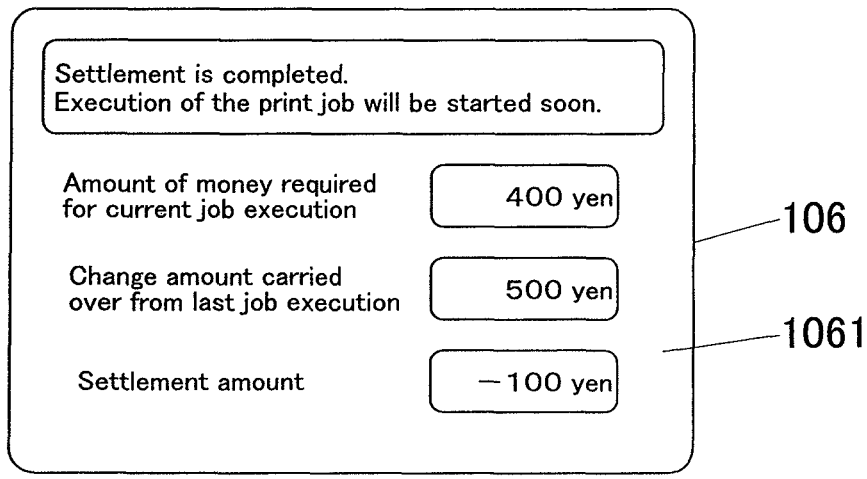
FIG. 11 is a view showing still yet another example of the payment completion screen.
FIG. 12 is a view showing a list of refund information.

FIG. 12 shows a list of refund information recorded in the memory 107.

There recorded therein as refund information, a refund amount, refund transferable days entered by user via the screen of FIG. 7 and a refund method selected by user, which are related to identification information (referred to as "electronic money ID" in FIG. 12) of the payment medium 6.

As described above in this embodiment, a refund amount and other data related to identification information uniquely given to the payment medium 6 are recorded therein. This could prevent the inconvenience that a refund is maliciously transferred to a payment medium not owned by a right user, but owned by an evil-minded third person trying to cancel job execution forcibly.

Furthermore, in this embodiment, when a copy job or print job is executed, an amount of money required for one copied or printed sheet is subtracted from a refund amount included in the refund information each time one sheet is fed. And if some sheets are not normally discharged due to a trouble such as a jam during job execution, an amount of money used for not discharged sheets is added onto the refund amount. In this way, a refund amount is correctly calculated.

When a user sets the payment medium 6 to the billing apparatus 3, the CPU 101 of the image forming apparatus 1 calls out of the refund information recorded in the memory 107, a refund amount related to the identification information of the payment medium 6. And it performs a settlement process based on the amount of money determined before job execution and the refund amount, and displays the screen of FIG. 8, 9, 10 or 11 on the display 1061 of the operation panel 106, and then starts job execution.

Figure 8:
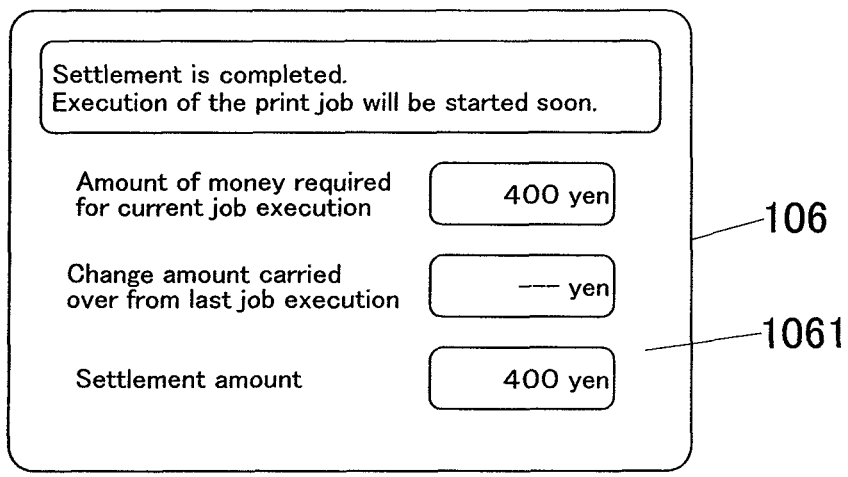
FIG. 8 is a view showing an example of a payment completion screen.

In the screens of FIG. 8 through FIG. 11, as well as the message telling that a settlement amount has been billed and execution of a job (a print job, for example) will be started soon, an amount of money required for current job execution, a change amount (refund amount) carried over from last job execution, and a settlement amount are displayed. If the refund amount in the refund information is zero, the amount of money required for current job execution is simply billed to the payment medium 6 set to the billing apparatus 3. Then the screen shown in FIG. 8 is displayed thereon.

Figure 9:
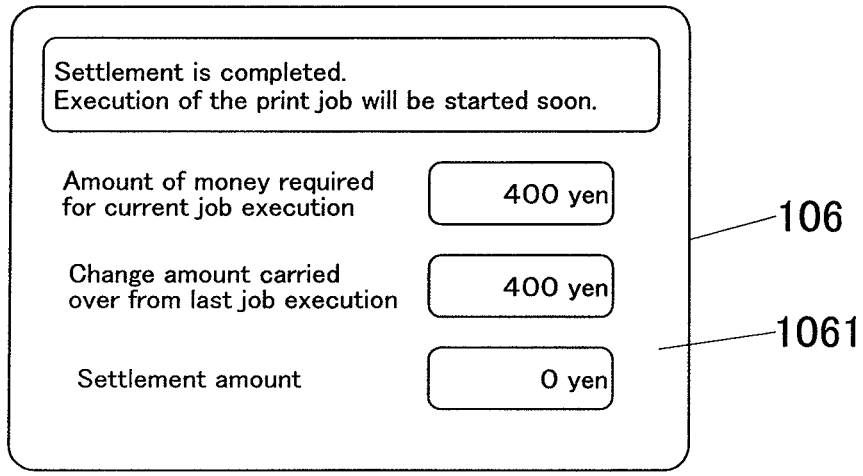
FIG. 9 is a view showing another example of the payment completion screen.

If the refund amount in the refund information is not zero and is equivalent to the amount of money required for current job execution, an operation to bill or refund to the payment medium 6 is not performed. Then the screen shown in FIG. 9 is displayed thereon.

Figure 10:
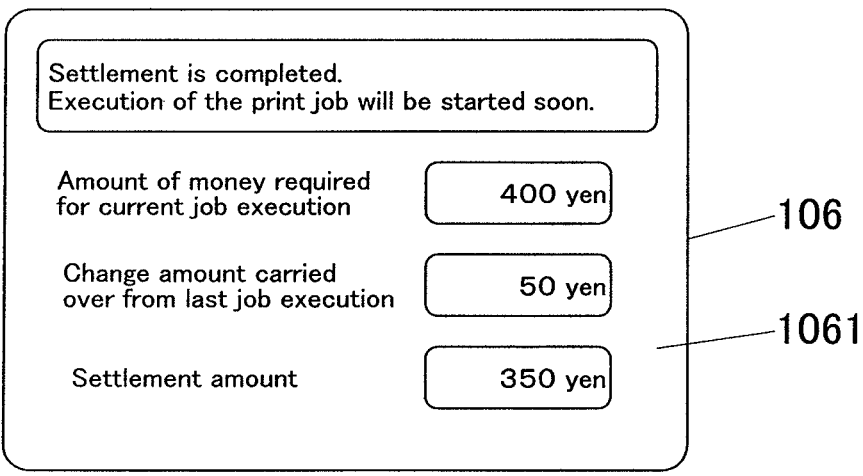
FIG. 10 is a view showing yet another example of the payment completion screen.

If the refund amount in the refund information is not zero and is smaller than the amount of money required for current job execution, a difference between these amounts is billed to the payment medium 6. Then, the screen shown in FIG. 10 is displayed thereon.

If the refund amount in the refund information is no zero and is larger than the amount of money required for current job execution, a difference between these amounts is refunded to the payment medium 6. Then the screen shown in FIG. 11 is displayed thereon.

Figure 13:
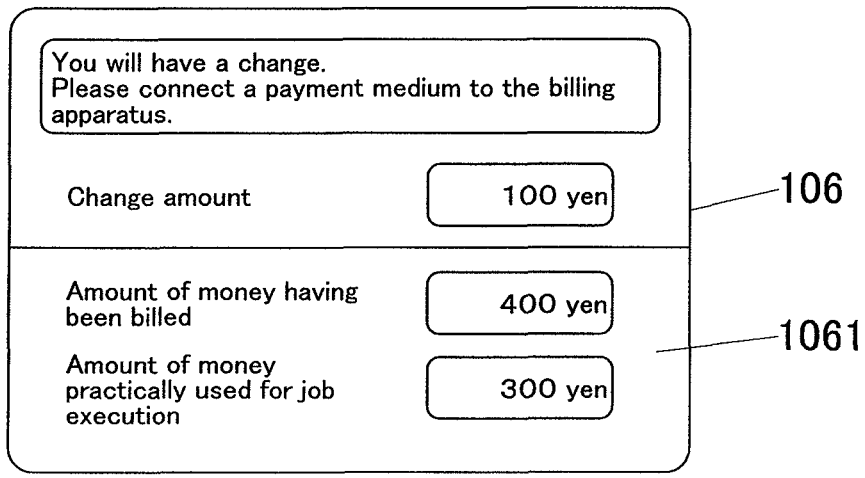
FIG. 13 is a screen to let users know the existence of a change.

If the refund amount is not zero at the end of job execution, a screen letting users know the existence of a change, which is shown in FIG. 13, is displayed on the display 1061 of the operation panel 106. In this screen, as well as a message requesting to receive a change by using the billing apparatus 3, a change amount, an amount of money having been billed and an amount of money practically used for job execution, are displayed.

The screen shown in FIG. 13 is switched to the initial screen after a lapse of a predetermined period of time, for example a couple of minutes.

Users can receive a refund after job execution, if he/she sets the payment medium 6 to the billing apparatus 3 within the refund transferable days entered via the refund method selection screen of FIG. 7. The billing apparatus 3 is always in a condition to detect the payment medium 6 set to the billing apparatus 3 and bill and refund to the payment medium 6. If the payment medium 6 owned by a user is set to the billing apparatus 3 within the refund transferable days, it is judged whether or not identification information of the payment medium 6 set to the billing apparatus 3 equals any identification information in the refund information list recorded in the memory 107. If it equals any, a refund is transferred to the payment medium 6. Meanwhile, even if the payment medium 6 owned by a different user is set to the billing apparatus 3 while the screen of FIG. 13 letting users know the existence of a change is displayed on the operation panel 16, it is judged whether or not identification information of the payment medium 6 equals any identification information in the refund information list, and a refund is transferred to the payment medium 6 if it equals any, in the same manner.

Figure 14:
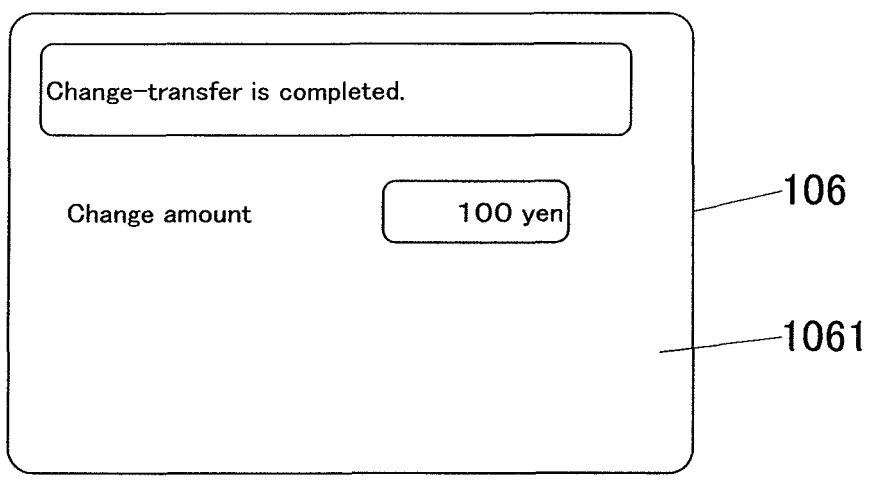
FIG. 14 is a screen to let users know the completion of refund.

After the completion of refund, a screen letting users know the completion of refund, which is shown in FIG. 14, is displayed on the display 1061 of the operation panel 106.

If an administrator's determined time comes around, the CPU 101 of the image forming apparatus 1 subtracts one from the value of "refund transferable days" in the refund information list recorded in the memory 107. And if the value of "refund transferable days" becomes zero, a refund is transferred by a refund method selected by user.

The CPU 101 of the image forming apparatus 1 transmits the identification information of the payment medium 6 and information about the transfer amount (the refund amount) and the refund method, to the electronic money administration server 7 via the network 9 or the cell-phone circuit 8.

Receiving this information, the electronic money administration server 7 performs a refund operation according to the received information. If the cell-phone 5 having the communication function is a receiving account to receive a refund, a refund is transferred to the cell-phone 5 according to information of the cell-phone, preliminarily registered therein. And then, the cell-phone 5 remits the refund amount received from the electronic money administration server 7, to an electronic money account created in the cell-phone 5 itself, by using software activating constantly, without the need of user operation.

If a receiving account to receive a refund, such as a credit card, does not have the communication function, the electronic money administration server 7 keeps in itself the identification information and the refund amount received from the image forming apparatus 1. And then, if a user performs an operation by using a terminal apparatus such as the user terminal 10 or the cell-phone 5 having the functions of reading out identification information, remitting to an electronic money account and connecting to the electronic money administration server 7, and software installed thereon to control these functions, the refund amount kept in the electronic money administration server 7 is remitted to the receiving account.

As described above in this embodiment, if an amount of money practically used for job execution is smaller than an amount of money determined before job execution, a refund can be transferred to the payment medium 6 by using the billing apparatus 3, and also can be refunded by a method other than the method of refunding to the payment medium 6 by using the billing apparatus 3. Thus, a user can receive a refund by a method other than the method using the billing apparatus 3, even if he/she forgets setting the payment medium 6 to the billing apparatus 3 and fails to receive a refund. In this way, a user can receive a refund unfailingly, which could eliminate the risk of over-billing troubles.

Figure 15:
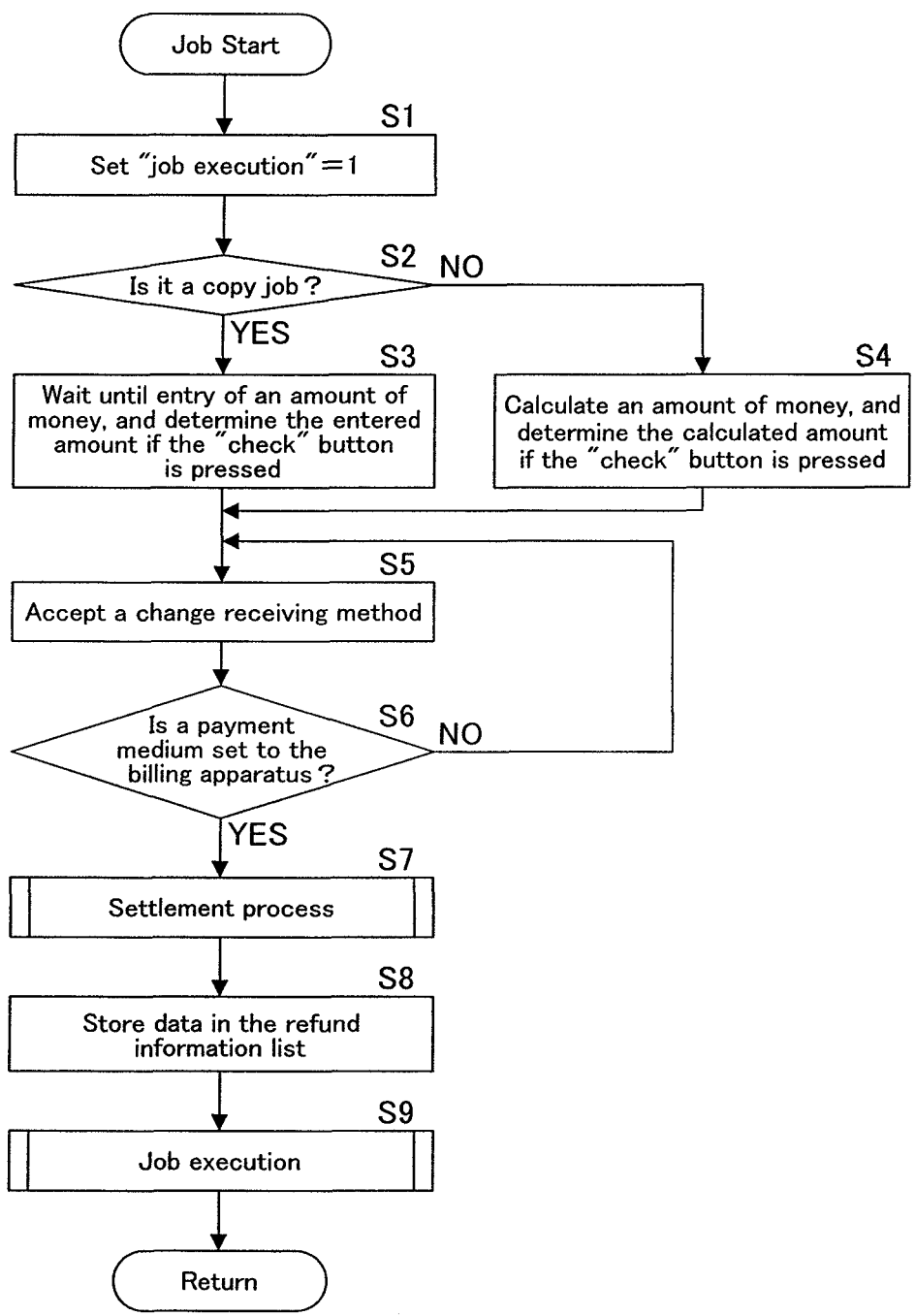
FIG. 15 is a flowchart representing a procedure executed in the image forming apparatus 1.

FIG. 15 is a flowchart representing a procedure executed in the image forming apparatus 1 shown in FIG. 1. This procedure is executed by the CPU 101 of the image forming apparatus 1 according to a program stored in the program ROM 102 or another recording medium.

In Step S1, a "job execution" flag is set to "1" in order to indicate that a job is now being executed, and it is judged in Step S2, whether or not it is a copy job. If it is a copy job (YES in Step S2), the screen shown in FIG. 6 is displayed on the operation panel 106 and the routine waits until an amount of money allowed for use is entered via the screen, and the entered amount is determined if the check button is pressed, in Step S3. After that, the routine proceeds to Step S5. If it is not a copy job (NO in Step S2), an amount of money required for job execution is calculated according to the selected job and the screen shown in FIG. 5 is displayed thereon, and the calculated amount is determined if the check button is pressed, in Step S4. After that, the routine proceeds to Step S5.

In Step S5, refund transferable days and a refund (change) receiving method that are specified by a user via the screen shown in FIG. 7, are accepted. Then, it is judged in Step S6, whether or not the payment medium 6 is set to the billing apparatus 3. If it is not set (NO in Step S6), the routine goes back to Step S5. If it is set (YES in Step S6), a settlement process is performed in Step S7. This settlement process will be detailed later.

Subsequently, data is stored in the refund information list in Step S8 and the job is executed in Step S9.

Figure 16:
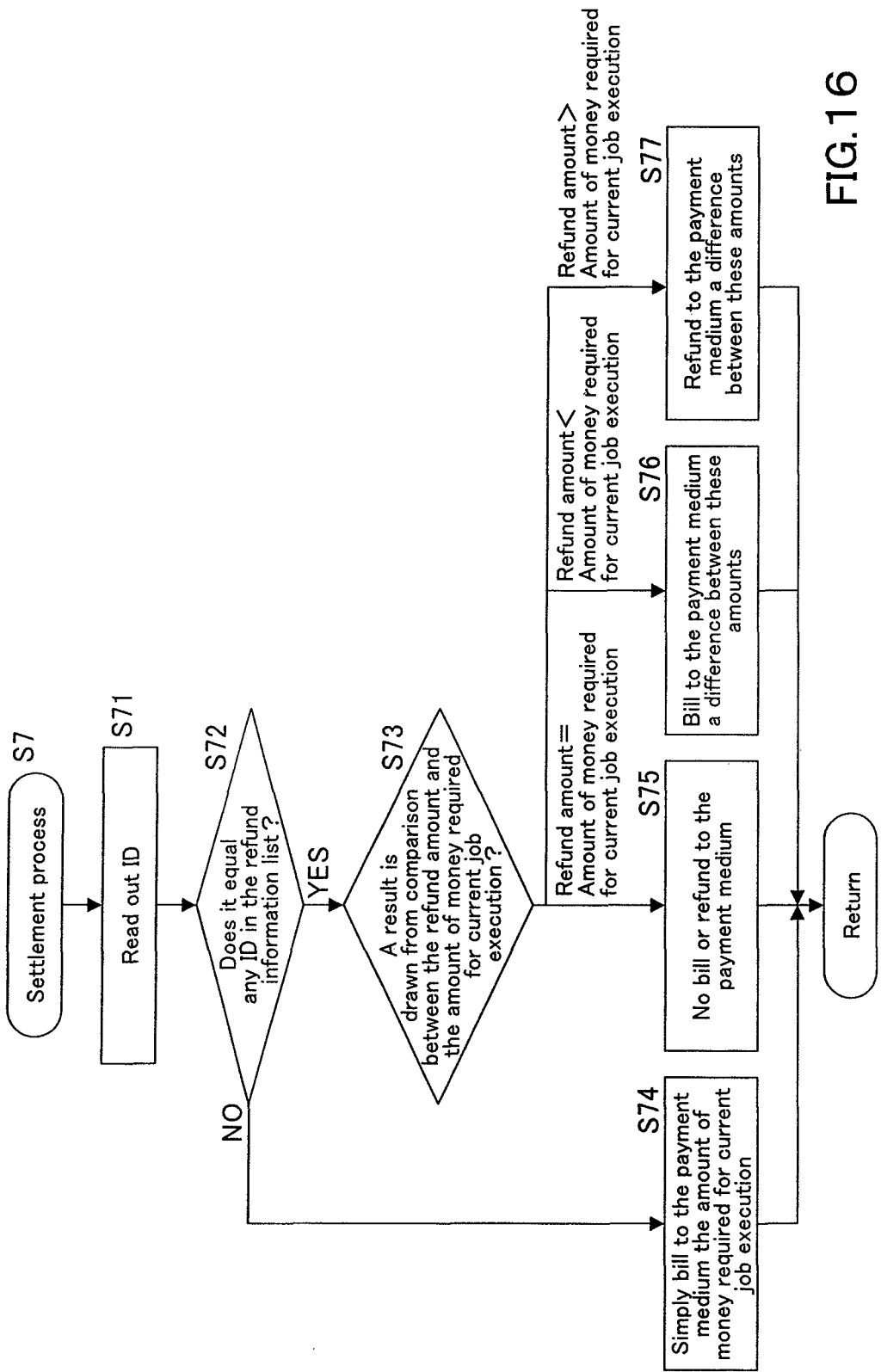
FIG. 16 is a flowchart representing a subroutine that corresponds to a settlement process in Step S7 of FIG. 15.

FIG. 16 is a flowchart representing a subroutine that corresponds to the settlement process in Step S7 of FIG. 15.

In Step S71, identification information (ID) of the payment medium 6 is read out. And it is judged in Step S72, whether or not it equals any identification information in the refund information list recorded in the memory 107. If it does not equal any (NO in Step S72), the amount of money required for current job execution is simply billed to the payment medium 6. That is, the payment medium 6 pays out the amount of money required for current job execution.

In Step S72, if it equals any identification information in the refund information list (NO in Step S72), the refund amount and the amount of money required for current job execution are compared to each other and a suitable process is performed according to a comparison result, in Step S73.

Concretely, if the refund amount is equivalent to the amount of money required for current job execution, an operation to bill or refund to the payment medium 6 is not performed in Step S75, and then the subroutine returns. If the refund amount is smaller than the amount of money required for current job execution, a difference between these amounts is billed to the payment medium 6 in Step S76, and then the subroutine returns. If the refund amount is larger than the amount of money required for current job execution, a difference between these amounts is refunded to the payment medium 6 in Step S77, and then the subroutine returns.

Figure 17:
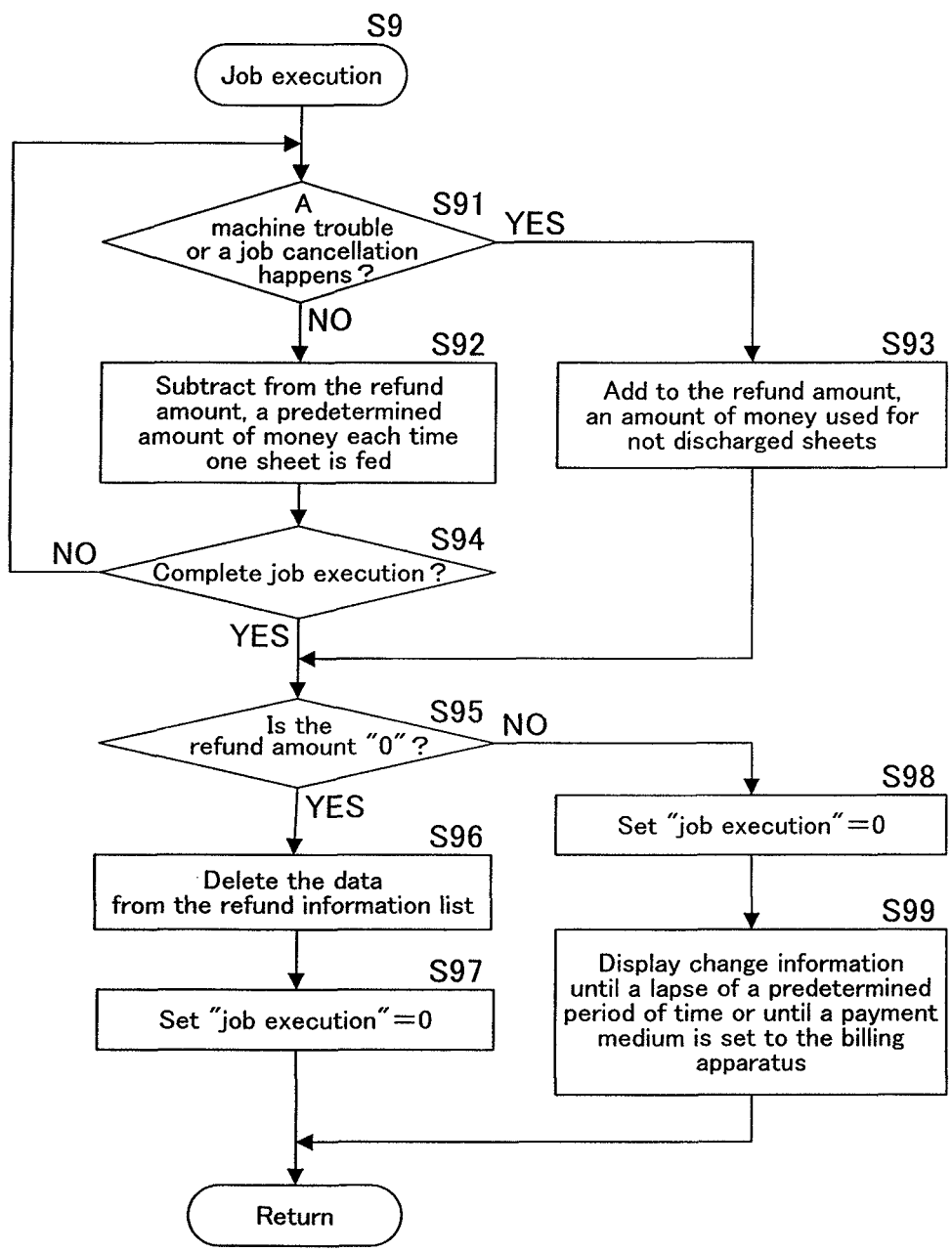
FIG. 17 is a flowchart representing a subroutine that corresponds to a job execution process in Step S9 of the flowchart shown in FIG. 15.

FIG. 17 is a flowchart representing a subroutine that corresponds to a job execution process in Step 9 of the flowchart shown in FIG. 15.

In Step S91, it is judged whether or not a machine trouble or a job cancellation happens to the image forming apparatus 1. If nothing like that happens (NO in Step S91), then in Step S92, an amount of money required for one copied or printed sheet is subtracted from the refund amount in the refund information each time one sheet is fed, and this subtracting operation is repeated until job execution is completed (until judged as NO in Step S94). If job execution is completed (YES in Step S94), the subroutine proceeds to Step S95.

In Step S91, if a machine trouble or a job cancellation happens to the image forming apparatus 1 (YES in Step S91), an amount of money used for not discharged sheets is added to the refund amount in Step S93. Then the subroutine proceeds to Step S95.

In Step S95, it is judged whether or not the refund amount in the refund information is zero. If the refund amount is zero (YES in Step S95), the corresponding data in the refund information list is deleted in Step S96, and the "job execution" flag is set to "0" in Step S97, in order to indicate that a job is not now being executed. And then, the subroutine returns. Meanwhile, if the refund amount is not zero (NO in Step S95), the "job execution" flag is set to "0" in Step S98, in order to indicate that a job is not now being executed, and the screen showing change information as FIG. 13, is displayed on the display 1061 of the operation panel 106 until a lapse of a predetermined period of time or until the payment medium 6 is set to the billing apparatus 3, in Step S99. And then, the subroutine returns.

Figure 18:
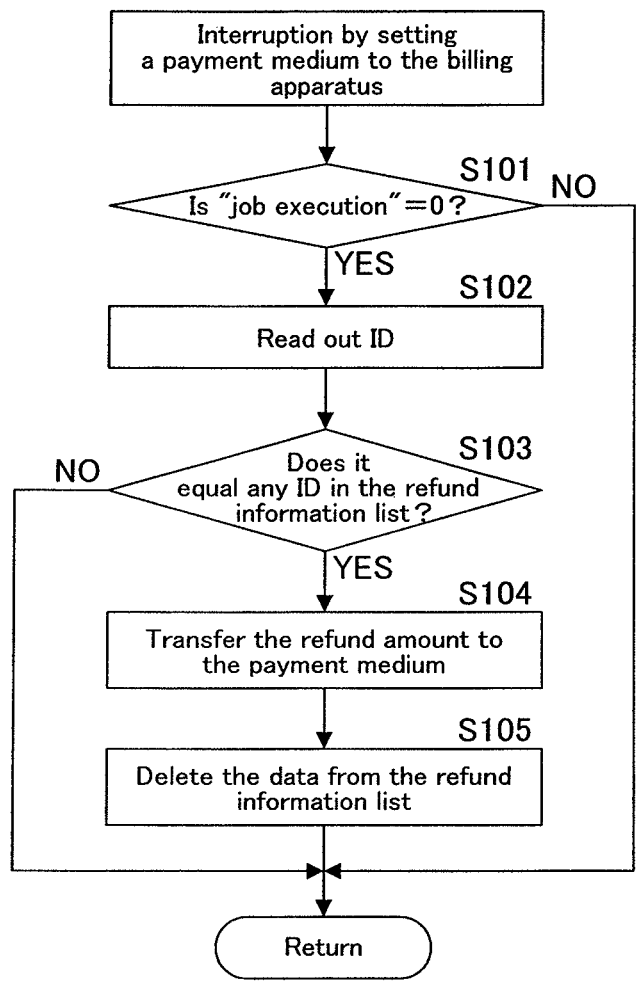
FIG. 18 is a flowchart representing an interruption procedure executed when a payment medium is set to a billing apparatus.

FIG. 18 is a flowchart representing an interruption procedure executed when the payment medium 6 is set to the billing apparatus 3.

In Step S101, under the control of the CPU 101 of the image forming apparatus 1, it is judged whether or not the "job execution" flag indicates "0". If it does not indicate "0" (NO in Step S101), the routine immediately returns since a job is now being executed. If it indicates "0" (YES in Step S101), identification information of the payment medium 6 set to the billing apparatus 3 is read out in Step S102. And it is judged in Step S103, whether or not it equals any identification information in the refund information list recorded in the memory 107.

If it does not equal any (NO in Step S103), the routine immediately returns. If it equals any identification information in the refund information list (YES in Step S103), a refund amount is transferred to the payment medium 6 in Step S104, and the corresponding data in the refund information list is deleted in Step S105. And then, the routine returns.

Figure 19:
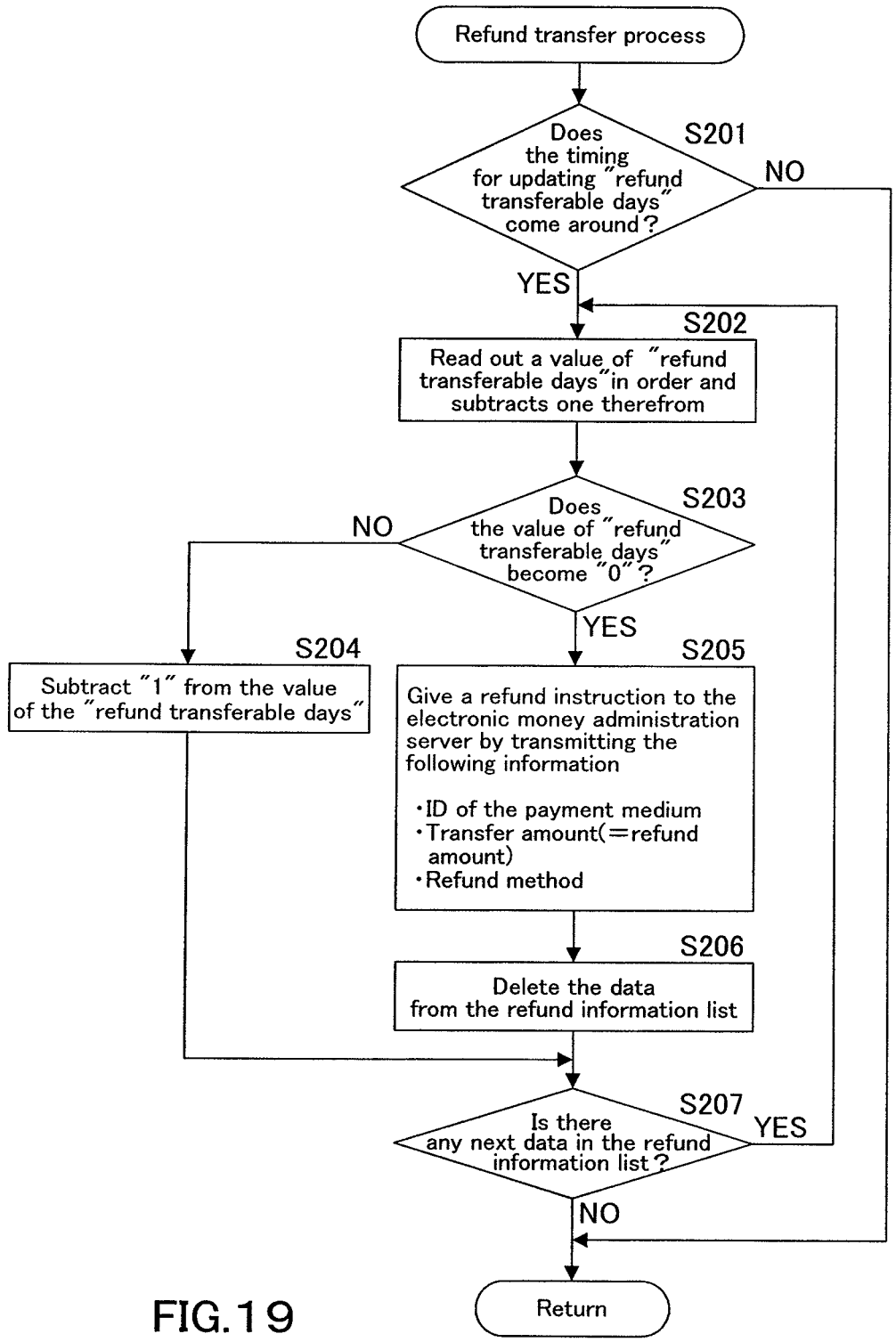
FIG. 19 is a flowchart representing a refunding procedure executed to transfer a refund by a method other than the method using the billing apparatus.

FIG. 19 is a flowchart representing a refund procedure to transfer a refund by a method other than the method using the billing apparatus 3.

In Step S201, under the control of the CPU 101 of the image forming apparatus 1, it is judged whether or not the time for updating "refund transferable days" in the refund information list comes around. If the time for updating does not come around yet (NO in Step S201), the routine returns.

If the timing for updating comes around (YES in Step S201), a value of "refund transferable days" is read out of the data in the top of the refund information list and one is subtracted from the value, in Step S202. And it is judged in Step S203, whether or not the value of "refund transferable days" becomes zero.

If the value of "refund transferable days" does not become zero (NO in Step S203), one is subtracted from the value in Step S204, then the routine proceeds to Step S207. If the value of "refund transferable days" becomes "0" (YES in Step S203), the identification information of the payment medium 6 and information about a transfer amount (refund amount) and a refund method, are transmitted to the electronic money administration server 7, and thereby a refund instruction is issued, in Step S205.

Then in Step S206, the corresponding data in the refund information list is deleted. And it is judged in Step S207, whether or not there is any next data in the refund information list.

If there is next data in the refund information list (YES in Step S207), the routine goes back to Step S202 and repeats Steps S202 through S206 until there is no next data in the refund information list any more. If there is no next data in the refund information list (NO in Step S207), the routine returns.

Figure 20:
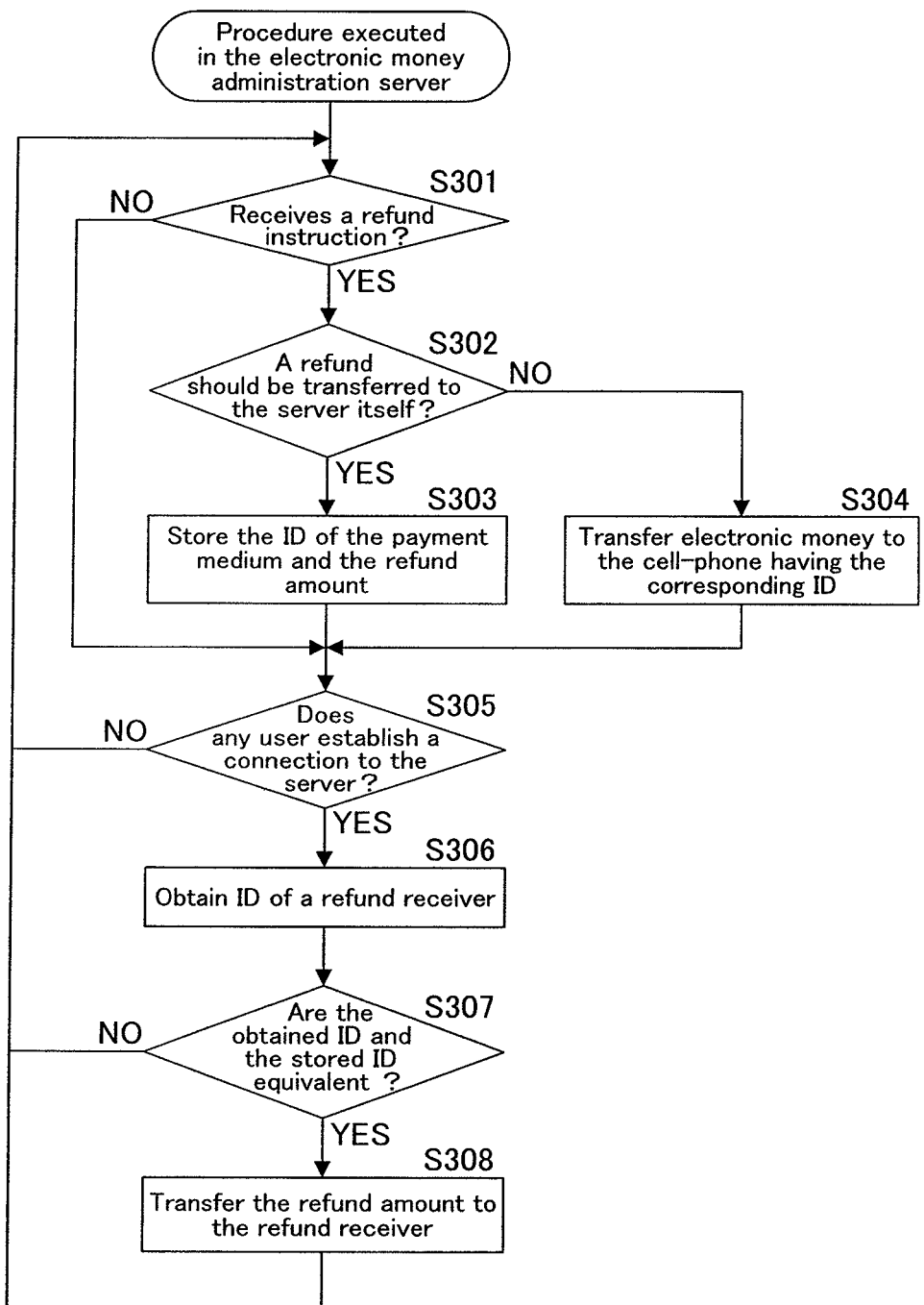
FIG. 20 is a flowchart representing a procedure executed in an electronic money administration server when a refund instruction is received from the image forming apparatus.

FIG. 20 is a flowchart representing a procedure executed in the electronic money administration server 7 when a refund instruction is received from the image forming apparatus 1.

In the electronic money administration server 7, in Step S301, it is judged whether or not a refund instruction is received from the image forming apparatus 1. If a refund instruction is received therefrom (YES in Step S301), then it is judged in Step S302, whether or not a refund should be transferred to the electronic money administration server 7 itself, by the refund method.

If it should be transferred to the electronic money administration server 7 itself (YES in Step S302), the identification information of the payment medium 6 and the refund amount received from the image forming apparatus 1 are stored in Step S303, then the routine proceeds to Step S305. If it should be transferred to a different destination (NO in Step S302), since it should be transferred to the cell-phone 5, the refund amount is transferred by electronic money to the cell-phone 5 having the corresponding identification information, in Step S304. And then, the routine proceeds to Step S305. Meanwhile in Step S301, if a refund instruction is not received from the image forming apparatus 1 (NO in Step S301), the routine also proceeds to Step S305.

In Step S305, it is judged whether or not any user establishes a connection to the electronic money administration server 7 by using a terminal apparatus. If a user establishes a connection thereto (YES in Step S305), identification information of a refund receiver is obtained in Step S306. And it is judged in Step S307, whether or not the identification information of the payment medium 6, which is stored in Step S303, and the identification information of the refund receiver, which is obtained in Step S306, are equivalent.

If those are equivalent (YES in Step S307), a refund is transferred by electronic money to the refund receiver in Step S308. If those are not equivalent (NO in Step S307), the routine goes back to Step S301.

Meanwhile in Step S305, if no user establishes a connection to the electronic money administration server 7 (NO in Step S305), or if the identification information of the payment medium 6 and the identification information of the refund receiver are not equivalent, the routine goes back to Step S301.

Each of the examples explained above relates to one embodiment of the present invention. However, the present invention is not limited to these embodiments.

For example, in these embodiments, a settlement process is performed by using a change amount carried over from last job execution and an amount of money required for current job execution. Alternatively, a refund amount may be transferred at each job execution. For example, it would be preferred to make the image forming apparatus 1 to stop executing a copy job as soon as an amount of money practically used for this job execution becomes larger than an amount of money entered by user before this job execution.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example" and "NB" which means "note well".

What is claimed is:

1. A job execution apparatus capable of accessing an electronic money management server configured to have a function to give a refund electronically, the job execution apparatus configured to have billing and refunding functions utilizing electronic money, comprising:
   a determination portion that determines before job execution, an amount of money required for job execution;
   a billing apparatus that is capable of detecting that a payment medium having a payment function has been set to the billing apparatus itself, billing before job execution the determined amount of money to the set payment medium, and performing a first refund function comprising transferring to the set payment medium a refund equal to an unused amount of money obtained by subtracting an amount of money actually used for job execution from the determined amount of money;
   a refunding portion that is capable of performing a second refund function comprising transferring a request for the refund equal to the unused amount of money, to the electronic money management server;

a judgment portion that judges whether or not a predetermined period of time, only for which the billing apparatus is allowed to refund to the payment medium using the first refund function, has elapsed after job execution; and a controller configured to: make the billing apparatus transfer to the payment medium the refund equal to the unused amount of money using the first refund function, if the billing apparatus detects that the payment medium has been set to the billing apparatus itself before the judgment portion judges that the predetermined period of time has elapsed after job execution; and make the refunding portion transfer to the electronic money management server the request for the refund equal to the unused amount of money using the second refund function, if the judgment portion judges that the predetermined period of time has elapsed after job execution before the billing apparatus detects that the payment medium has been set to the billing apparatus itself.

2. The job execution apparatus recited in claim 1, wherein the determination portion determines an amount of money required for job execution, according to a calculation result or a user instruction.

3. The job execution apparatus recited in claim 1, wherein the refunding portion transfers to the electronic money management server the request to the refund to the payment medium if the payment medium is configured to be in communication with the refunding portion.

4. The job execution apparatus recited in claim 3, wherein a user is allowed to select a preferable method to receive a refund.

5. The job execution apparatus recited in claim 1, further comprising:

a storage that stores in itself, refund information including a refund amount that is related to identification information uniquely given to the payment medium.

6. The job execution apparatus recited in claim 5, wherein:

a copy job or a print job is executed, and further comprising:

a calculator that subtracts an amount of money used for one sheet from the refund amount included in the refund information, every time one sheet is fed, and adds an amount of money used for some sheets to the refund amount included in the refund information, if the sheets are not normally discharged.

7. The job execution apparatus recited in claim 5, further comprising:

a comparator that compares the amount of money supposed to be billed to the payment medium set to the billing apparatus and the refund amount that is included in the refund information and related to the identification information uniquely given to the payment medium, before the billing apparatus bills to the payment medium wherein the controller makes the billing apparatus to bill to the payment medium a difference between those amounts if the amount of money supposed to be billed for job execution is larger than the refund amount; the controller makes the billing apparatus to refund to the payment medium a difference between those amounts if the amount of money supposed to be billed for job execution is smaller than the refund amount; the controller makes the billing apparatus neither bill nor refund to the payment medium if the amount of money supposed to be billed for job execution is equivalent to the refund amount, and then, after any of the events above, the controller initializes the value of the refund amount included in the refund information, to zero.

8. A billing and refunding method implemented by a job execution apparatus capable of accessing an electronic money management server configured to have a function to give a refund electronically, the job execution apparatus comprising a billing apparatus and being capable of billing and refunding to a payment medium having a payment function by electronic money with use of the billing apparatus, comprising:

determining before job execution, an amount of money required for job execution;

detecting that the payment medium has been set to the billing apparatus and billing before job execution, the determined amount of money to the payment medium set to the billing apparatus;

judging whether or not a predetermined period of time, only for which the billing apparatus is allowed to refund to the payment medium using the first refund function, has elapsed after job execution; and transferring to the payment medium a refund equal to an unused amount of money obtained by subtracting an amount of money actually used for job execution from the determined amount of money, if the billing apparatus detects that the payment medium has been set to the billing apparatus itself before it is judged that the predetermined period of time has elapsed after job execution; and transferring to the electronic money management server a request for the refund equal to the unused amount of money, if it is judged that the predetermined period of time has elapsed after job execution before the billing apparatus detects that the payment medium has been set to the billing apparatus.

9. A non-transitory recording medium having a billing and refunding program recorded therein to make a computer of a job execution apparatus capable of accessing an electronic money management server configured to have a function to give a refund electronically, the job execution apparatus comprising a billing apparatus and being capable of billing and refunding to a payment medium having a payment function by electronic money with use of the billing apparatus, execute:

determining before job execution, an amount of money required for job execution;

detecting that the payment medium has been set to the billing apparatus and billing before job execution, the determined amount of money to the payment medium set to the billing apparatus;

judging whether or not a predetermined period of time, only for which the billing apparatus is allowed to refund to the payment medium using the first refund function, has elapsed after job execution; and transferring to the payment medium a refund equal to an unused amount of money obtained by subtracting an amount of money actually used for job execution from the determined amount of money, if the billing apparatus detects that the payment medium has been set to the billing apparatus itself before it is judged that the predetermined period of time has elapsed after job execution; and transferring to the electronic money management server a request for the refund equal to the unused amount of money, if it is judged that the predetermined period of time has elapsed after job execution before the billing apparatus detects that the payment medium has been set to the billing apparatus.

* * * * *